April 17, 1962
B. T. ARNBERG ET AL
3,029,601
AIR MASS FLOW COMPUTER
Filed Jan. 13, 1958
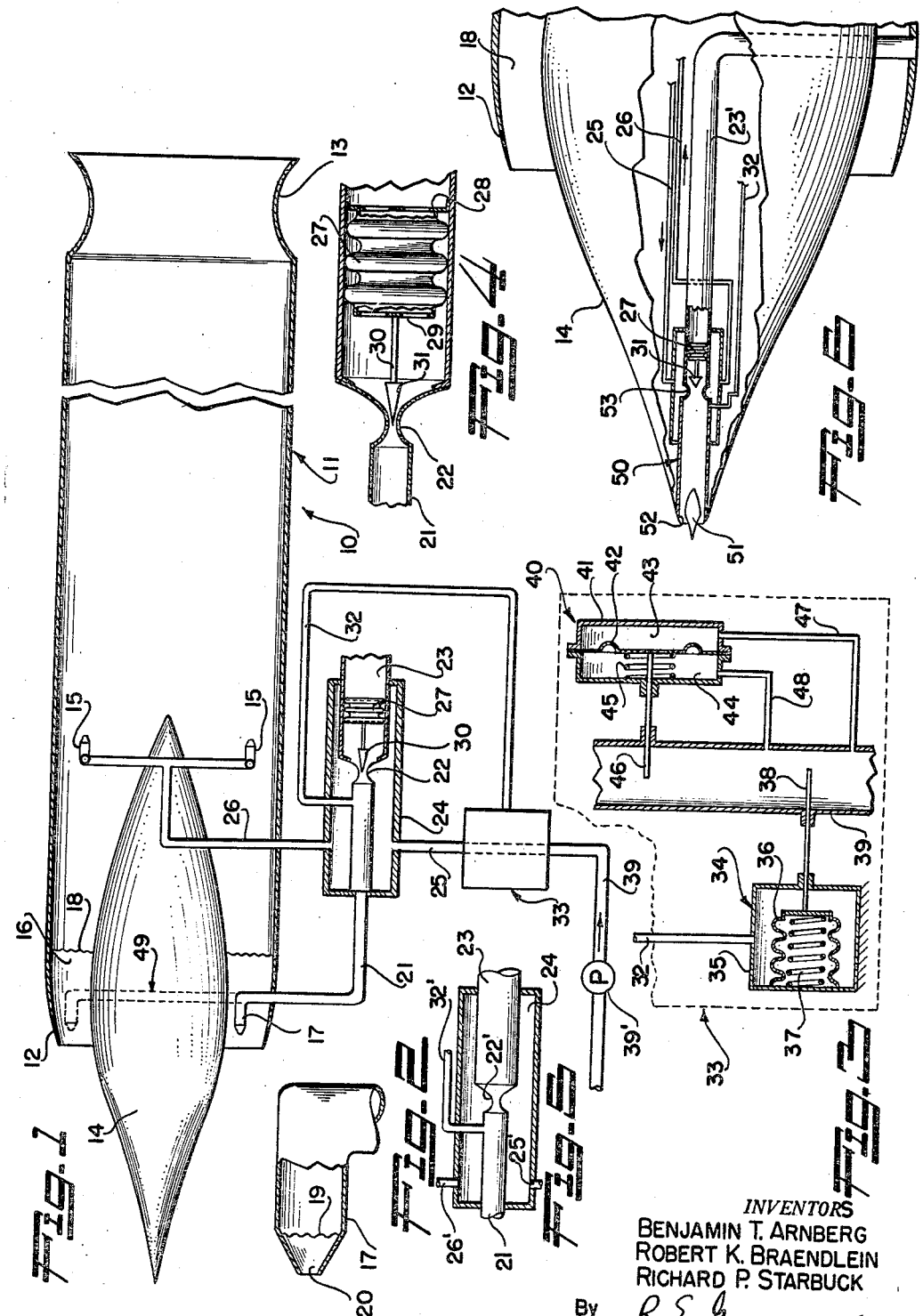
INVENTORS
BENJAMIN T. ARNBERG
ROBERT K. BRAENDLEIN
RICHARD P. STARBUCK
By R. E. Geauque
Attorney United States Patent Office 3,029,601
Patented Apr. 17, 1962

3,029,601
AIR MASS FLOW COMPUTER
Benjamin T. Arnberg, Boulder, Colo., and Robert K. Braendlein, Granada Hills, and Richard P. Starbuck, Encino, Calif., assignors to The Marquardt Corporation, a corporation of California
Filed Jan. 13, 1958, Ser. No. 708,675
11 Claims. (Cl. 60—35.6)

This invention relates to an air mass flow computer and more particularly to a computer for providing a pressure which is directly proportional to the mass air flow through a duct or jet engine.

A computer which provides an indication of engine mass air flow is disclosed in United States application Ser. No. 485,759, filed February 2, 1955, by John A. Drake and assigned to the same assignee. However, this computer does not provide a signal which varies directly with engine mass air flow under all operating conditions since changes in the value of the total temperature at the engine exit are not compensated for. While a false signal of air flow is provided, it has been determined that the false signal can be utilized for controlling the fuel-air ratio of the engine.

In the present invention the computer provides a signal which is directly proportional to engine air flow under all conditions and this signal controls the engine fuel flow to maintain a substantially constant fuel-air ratio schedule at all operational altitudes and Mach number, regardless of variations in ambient temperature, fuel supply temperature and angle of attack. In one form of the invention, a flow sampling device is inserted in supersonic flow within the engine duct and the mass flow in the sampling device is a constant fraction of the flow in the engine duct as determined by the ratio between the area of the sampling device and the area of the engine duct. The flow in the sampling device is discharged through a choked exit nozzle having sonic velocity flow at its throat and the pressure ahead of the nozzle is sensed by a pressure probe. The air temperature at the exit nozzle can be maintained constant by a heat exchanger so that the probe pressure will be directly proportional to engine air flow. Also, engine fuel can be passed through the heat exchanger before entering the engine, but since the fuel temperature does not remain constant, the air temperature ahead of the exit nozzle of the sampling device will vary with fuel temperature. However, this variation is compensated for by utilizing a variable area exit nozzle having a needle movable by a bellows or other devices responsive to fuel temperature. The variation of nozzle area by the needle compensates for changes in air temperature so that the pressure ahead of the nozzle is continually proportional to mass air flow through the engine. In another embodiment of the invention, the sampling device comprises a miniature diffuser of the same design as the engine diffuser and located in the supersonic freestream. The miniature diffuser is connected with an exit nozzle and the control pressure is obtained ahead of the nozzle. While the present invention will be described in connection with the fuel control system for a supersonic ramjet engine, it can also be utilized to measure mass flow in supersonic turbojet engines and in industrial processes wherein supersonic flow exists. It is understood that the invention can be utilized with any other compressible fluid in addition to air.

It is therefore an object of the present invention to provide an air mass flow computer which develops a pressure signal proportional to air mass flow in a supersonic duct or flow passage.

Another object of the invention is to provide an air mass flow computer which samples the supersonic air flow through a jet engine and adjusts the temperature of the air sample before discharge through a choked nozzle.

Another object of the invention is to provide an air mass flow computer which captures an air flow proportional to the air flow in a jet engine and adjusts the temperature of the captured air to the fuel temperature prior to discharge through a choked orifice whose area is varied with fuel temperature.

These and other objects of the invention not specifically set forth above will be come apparent from the accompanying description and drawings in which:

FIGURE 1 is a diagrammatic illustration of the invention as incorporated in a ram jet engine;

FIGURE 2 is an enlarged view of the pressure probe of FIGURE 1 showing the position of normal shock;

FIGURE 3 is a diagrammatic illustration of the fuel control systems responsive to the control pressure produced by the computer;

FIGURE 4 is an enlarged diagrammatic view of the temperature responsive bellows for varying the area of the exit nozzle;

FIGURE 5 is a diagrammatic illustration of a fixed area exit nozzle within a heat exchanger receiving a constant temperature heating medium; and FIGURE 6 is a diagrammatic illustration of a modification of the invention wherein pressure probe having a diffuser is located in the engine diffuser.

Referring to the embodiment of FIGURES 1–4, the ram jet engine 10 is comprised of a duct 11 having an inlet 12 at one end and an exit nozzle 13 at the opposite end. A diffuser body 14 is located within the inlet 12 and a plurality of fuel injector nozzles 15 are located aft of the diffuser body. An annular air passage 16 is located between the diffuser body and the inlet and a stagnation pressure probe 17 is positioned within the passage 16. In order for a probe of this type to receive a fixed fraction of the air flow within the engine as defined by the area ratio between the probe opening and the passage 16 the air flow at the probe must be supersonic and therefore the engine diffuser must continually operate supercritically with the normal shock 18 occurring aft of the probe. Also, the probe itself must operate supercritically so that the normal shock 19 occurs aft of the probe opening 20. In the event that the probe operated subcritically, the amount of air swallowed by the probe would not be a fixed fraction of the engine air flow as determined by the area ratio. With both the engine diffuser and the pressure probe operating supercritically, the air intake to both will be in proportion to the inlet area.

The fixed proportion of engine air flow extracted by probe 17 is directed by passage 21 to an exit nozzle or orifice 22 which discharges to a low pressure level, such as atmospheric static pressure, through a larger passage 23. The pressure ratio across the orifice 22 is sufficient to cause sonic velocity flow at the throat of the orifice, or in other words, is sufficient to choke the orifice. The orifice 22 and the ends of passages 21 and 23 adjacent the orifice are surrounded by a chamber 24 which receives engine fuel from line 25 and discharges engine fuel to injector nozzles 15 through line 26. Also, the passage 23 contains a temperature responsive bellows 27 secured at one end to the passage by an open grid plate 28. The other end of the bellows supports an open grid plate 29 to which is attached stem 30 of needle valve 31. The needle valve 31 is located within the orifice 22 in order to vary the area of the orifice upon contraction or expansion of bellows 27. It is therefore apparent that the air sample in passage 21 ahead of orifice 22 will be at the fuel temperature because of the heat exchange relationship with the volume of fuel flowing through chamber 24. Also, the bellows 27 will be at the temperature of the fuel so that the area of orifice 22 will vary with fuel temperature. During the operation of engine 10, the fuel temperature will depend upon the ambient temperature and will increase somewhat with flight time. Thus, the fuel temperature will not remain constant.

The pressure immediately upstream of orifice 22 is sensed in passage 32 and this pressure signal is supplied to the fuel control system 33. The sensed pressure conforms to the following equation, referenced to exit nozzle conditions:

$$P = \frac{Wa\sqrt{T_t}}{f(m)A}$$

where P is the pressure signal, $Wa$ is the mass flow through the orifice, $T_t$ is the total temperature at the orifice, $f(m)$ is a function of Mach number and A is the area of the orifice. Since the nozzle is choked, $f(m)$ is a constant. The temperature $T_t$ will vary with fuel temperature and therefore, the needle valve 31 is contoured to vary the exit nozzle area proportionally to the square root of the fuel temperature so that the ratio $\sqrt{T_t}/A$ is held constant. Thus, the pressure P will be directly proportional to mass air flow through the nozzle 22 and since the air flow through nozzle 22 is a fixed fraction of the mass air flow through the engine, the pressure P is directly proportional to engine mass air flow, and can be utilized to maintain the desired fuel-air ratio for the engine. As illustrated by the modification of FIGURE 5, an orifice 22' of fixed area can be utilized between passages 21 and 23 providing that the fluid entering chamber 24 by passage 25' and leaving by passage 26' is supplied by a constant temperature source. In such case, the terms $T_t$ and A, as well as the term $f(m)$, in the above equation are constant and pressure P in passage 32' is directly proportional to mass air flow $Wa$.

As illustrated in FIGURE 3, the passage 32 connects the pressure P with the fuel regulator 34 of the fuel control 33. The regulator comprises a casing 35 containing an evacuated bellows 36 which is biased by a spring 37. The pressure P is introduced to the interior of casing 35 and acts against the spring to move the valve 38 connected with the bellows. The valve 38 serves to vary the flow area of fuel line 39 which contains the fuel pump 39'. In order that the fuel flow in passage 39 will be proportional to flow area at valve 38, a differential pressure regulator 40 serves to provide a constant pressure drop across valve 38. The regulator 40 comprises a casing 41 containing a flexible diaphragm 42 which divides the casing into chambers 43 and 44. A spring 45 in chamber 44 acts against one side of the diaphragm and the diaphragm is connected with valve 46 in fuel line 39. Chamber 43 is connected with the pressure upstream of valve 38 and by passage 47 and chamber 44 is connected with the pressure downstream of valve 38 by passage 48. Thus, the valve 46 serves to maintain a constant pressure drop across valve 38 so that the fuel flow in line 39 is proportional to the position of the valve 38 and to the pressure P in passage 32. Since the pressure P is a fixed fraction of the mass air flow through the engine, the fuel system 33 can provide a constant fuel-air ratio for the engine. As is apparent, the line 39 connects with line 25 in order to supply the fuel to chamber 24 and then to nozzles 15.

In operation of the computer, a change in mass air flow through the engine will result in a corresponding change in the control pressure P and the pressure P will change the position of valve 38 to maintain the selected fuel-air ratio. An important criterion of the invention is that the engine air flow be sampled fairly accurately. Therefore, the pressure probe 17 can form one probe of a multi-probe system 49 illustrated by dotted lines in FIGURE 1, which can be utilized under conditions where velocity profiles in the engine are non-uniform or are subject to change.

A modification of the invention is illustrated in FIGURE 6 wherein the same reference numerals denote like parts in the prior embodiment. A pressure probe 50 is located at the nose of diffuser body 14, and has a supersonic diffuser 51 and inlet 52 which are substantially scaled to the inlet of main engine 10. The exit nozzle 53 downstream of the diffuser body 51 connects with passage 23' which extends through the main diffuser body 14 and engine passage 18 and discharges to free steam static pressure. Passage 23' contains the temperature sensitive bellows 27 which moves the needle 31 to vary the area of the nozzle 53. The chamber 24 surrounds the exit nozzle 53 and bellows 27 and is connected with fuel line 25. Fuel is discharged from chamber 24 through line 26 which leads to the fuel injectors 15. The passage 32 connects with the pressure immediately ahead of the nozzle 53 and supplies the control pressure P to the fuel system 33 which controls the fuel flow through lines 25 and 26. It is understood that the fuel system for this modification is the same as for the prior embodiment, and that the capacity of chamber 24 is sufficient to provide a temperature at the nozzle 53 and at the bellows 27 which is the same as the fuel temperature.

During supersonic flight, the pressure probe 50 senses free stream conditions and has the same capture area characteristics as the inlet for engine 10 during variations in Mach number and angle of attack, provided that both the probe and the engine inlet are operating supercritically. Therefore, the probe mass flow will be proportional to engine mass flow by a factor determined by the ratio between the probe inlet area and the engine inlet area. Also the control pressure P in passage 32 will be proportional to engine air mass flow at all free stream ambient temperatures since the air at exit nozzle 53 is at the fuel temperature and the area of the nozzle is varied by needle 31 to maintain the ratio $\sqrt{T_t}/A$ at a constant value.

The computer of the present invention can be utilized to sense mass flow in any apparatus or process where there is supersonic flow in a duct and a heat transfer medium is available to adjust the temperature of fluid sampled by the probe prior to discharge through the exit nozzle connected with the probe. With supersonic flow, the amount of air captured by the probe is proportional to the inlet area of the probe and is not affected by the presence of the exit nozzle connected with the probe. Since the flow in the pressure probes is effected in the same manner as the flow in the engine during changes in altitude, Mach number and angle of attack, the flow sample is continually proportional to flow through the engine. Also, the mass flow through the pressure probe is corrected for variations in ambient temperature and fuel supply temperature. If desired, the contour of the needle can also provide for correction of fuel flow for factors, in addition to mass air flow, which vary with fuel temperature. It is understood that other control devices can be utilized for jet engines within the flight speed range below which the present invention operates. Various other modification are contemplated by those skilled in the art without departing from the spirit and scope of the invention as hereinafter defined by the appended claims.

What is claimed is:

1. A computer for sensing mass air flow through a jet engine having an inlet diffuser and operating at supersonic speeds comprising pressure probe means carried by said engine and responsive to supersonic flow for capturing a fixed fraction of the air flow through said engine, a nozzle connected with said probe means and discharging to a sufficiently low pressure to cause sonic velocity flow at the throat of the nozzle, a temperature source having a temperature independent of the freestream temperature of said captured air, means responsive to the temperature of said source for making the temperature of the captured air substantially the same as the temperature of said source, means responsive to the temperature of said source for varying the area of said nozzle to provide a pressure upstream of the nozzle which is proportional to mass air flow through the engine, and means for sensing said upstream pressure to obtain a pressure signal proportional to the mass air flow through the engine.

2. A computer as defined in claim 1 wherein said probe means comprises a probe located in the engine inlet forward of the normal shock and subjected to supersonic flow in the engine, both said probe and said engine inlet operating supercritically so that the probe captures a fixed fraction of the air flow through said engine.

3. A computer as defined in claim 1 wherein said probe means comprises a probe containing a miniature inlet diffuser of substantially the same geometry as the engine diffuser, said probe being located in the supersonic freestream and both said probe and said engine inlet operating supercritically so that the probe captures a fixed fraction of the air flow through said engine.

4. A computer as defined in claim 1 wherein said temperature source comprises the fuel supply for said engine, said compensating means comprises a heat exchanger means for adjusting the temperature of the captured air upstream of said nozzle, means for connecting said heat exchanger means with fuel delivered to said engine so that the temperature of the captured air is adjusted to the fuel temperature, and temperature responsive means for varying the area of said nozzle in accordance with fuel temperature to maintain a constant ratio between the square root of total temperature at the nozzle and the area of the nozzle.

5. A computer as defined in claim 4 wherein said temperature response means comprises expansion means subject to the temperature of the fuel, and a needle valve connected with said expansion means and located in said nozzle to vary the area thereof.

6. A fuel regulating system for controlling the fuel-air ratio of a jet engine having an inlet diffuser and operating at supersonic speeds comprising pressure probe means carried by said engine and responsive to supersonic flow for capturing a fixed fraction of the air flow through said engine, a nozzle connected with said probe means and discharging to a sufficiently low pressure to cause sonic velocity flow at the throat of the nozzle, a temperature source having a temperature independent of the freestream temperature of said captured air, means responsive to the temperature of said source for maintaining the temperature of the captured air substantially the same as the temperature of said source, means responsive to the temperature of said source for varying the area of said nozzle to provide a pressure upstream of the nozzle which is a substantially constant proportion of the mass air flow through the engine, means for sensing said pressure, and fuel regulator means connected with said sensing means and responsive to said pressure for regulating the fuel flow to said engine in accordance with changes in said pressure in order to control the fuel-air ratio of the engine.

7. A fuel regulator system as defined in claim 6 wherein said temperature source comprises the fuel supply for said engine, said compensating means comprises a heat exchanger means for adjusting the temperature of the captured air upstream of said nozzle, means for connecting said heat exchanger means with the fuel flow to said engine to adjust the temperature of the captured air to the fuel temperature, and temperature responsive means for varying the area of said nozzle in accordance with fuel temperature to maintain a constant ratio between the square root of total temperature at the nozzle and the area of the nozzle.

8. A fuel regulator as defined in claim 7 wherein said temperature responsive means comprises expansion means surrounded by said heat exchanger means and located in the flow path of the captured air downstream of said nozzle, and a needle valve connected with said expansion means and located in said nozzle to vary the area thereof.

9. A fuel regulator system as defined in claim 7 wherein said probe means comprises a probe located in the engine inlet forward of the normal shock and subjected to supersonic flow in the engine, both said probe and said engine inlet operating supercritically so that the probe captures a fixed fraction of the air flow through said engine.

10. A fuel regulator system as defined in claim 7 wherein said probe means comprises a probe containing a miniature inlet diffuser of substantially the same geometry as the engine diffuser, said probe being located in the supersonic freestream and both said probe and said engine inlet operating supercritically so that the probe captures a fixed fraction of the air flow through said engine.

11. A computer for sensing mass air flow through a jet engine having an inlet diffuser and operating at supersonic speeds comprising pressure probe means carried by said engine and responsive to supersonic flow for capturing a fixed fraction of the air flow of the engine, a nozzle connected with said probe means and discharging to a sufficiently low pressure to cause sonic velocity flow at the throat of the nozzle, a temperature source having a temperature independent of the freestream temperature of the captured air, means in heat exchange relationship with said temperature source for making the temperature of the captured air substantially the same as the temperature of said independent source, means in heat exchange relationship with said temperature source for varying the throat area of said nozzle to provide a pressure upstream of the nozzle which is a constant proportion of the mass air flow through the engine, and means for sensing said upstream pressure to obtain a pressure signal proportional to the mass air flow through the engine.

References Cited in the file of this patent

UNITED STATES PATENTS

| | | |
|---|---|---|
| 2,549,622 | Moore et al. | Apr. 17, 1951 |
| 2,606,420 | Moore | Aug. 12, 1952 |
| 2,641,105 | Drake | June 9, 1953 |
| 2,855,753 | McLafferty | Oct. 14, 1958 |
| 2,954,667 | Laurent | Oct. 4, 1960 |

FOREIGN PATENTS

| | | |
|---|---|---|
| 762,179 | Great Britain | Nov. 28, 1956 |
| 765,694 | Great Britain | Jan. 9, 1957 |